United States Patent [19]

Zhang

[11] Patent Number: 5,379,198
[45] Date of Patent: Jan. 3, 1995

[54] COURTESY LAMP SYSTEM FOR VEHICLES

[76] Inventor: Zhijie Zhang, 469 S. 7th St., San Jose, Calif. 95112

[21] Appl. No.: 985,664

[22] Filed: Dec. 4, 1992

Related U.S. Application Data

[63] Continuation-in-part of Ser. No. 911,259, Jul. 7, 1992, abandoned, which is a continuation-in-part of Ser. No. 815,573, Dec. 26, 1991, abandoned, which is a continuation-in-part of Ser. No. 809,647, Dec. 17, 1991, abandoned.

[51] Int. Cl.⁶ .............................................. B60Q 1/26
[52] U.S. Cl. .................... 362/83.1; 362/143; 359/844; 359/872
[58] Field of Search ............ 362/83.1, 140, 143, 362/144; 340/468, 470; 359/872, 844

[56] References Cited

U.S. PATENT DOCUMENTS

| | | | |
|---|---|---|---|
| 2,190,123 | 7/1938 | Pace | 362/80.1 |
| 2,400,655 | 5/1946 | Saia | 340/470 |
| 2,457,348 | 12/1948 | Chambers | 362/83.1 X |
| 2,689,948 | 9/1954 | Rothman | 362/83.2 |
| 2,733,311 | 1/1956 | Brown | 340/468 X |
| 2,831,176 | 4/1958 | Liberto | 340/468 X |
| 3,665,392 | 5/1972 | Annas | 340/67 |
| 3,800,430 | 4/1974 | Samra | 340/468 |
| 4,431,984 | 2/1984 | Bileck | 340/468 |
| 4,574,269 | 3/1986 | Miller | 340/468 |
| 4,791,402 | 12/1988 | Vaughn | 362/253 X |
| 4,989,966 | 2/1991 | Kim | 359/872 |
| 5,016,996 | 5/1991 | Ueno | 362/83.1 |
| 5,253,115 | 10/1993 | Ueno | 362/83.1 X |

FOREIGN PATENT DOCUMENTS 3408270 12/1985 Germany .

*Primary Examiner*—Stephen F. Husar
*Attorney, Agent, or Firm*—Townsend and Townsend Khourie and Crew

[57] ABSTRACT

Courtesy lamp system for a vehicle in which a lamp structure in a housing is associated with a rear view mirror assembly. The housing has a divider panel to divide the housing into upper and lower recesses containing light sources. A pair of green light sources are in the upper recess and at the rear of the vehicle, respectively, a red light source is in the lower recess. The green light sources are coupled by circuitry to manual switches and the vehicle brake light is coupled to a third switch. Thus, when the first manual switch is actuated, the light source in the upper recess will blink on and off. When a second switch is actuated, it will turn the green light source on and off at the rear of the vehicle. When the brake pedal is depressed, it will close the third switch which will actuate the red light source and the brake light to indicate that the brake has been applied. The mirror is coupled by universal joint to an inner end wall surface of the housing. Thus, the mirror can be adjusted in all directions relative to the housing.

20 Claims, 6 Drawing Sheets

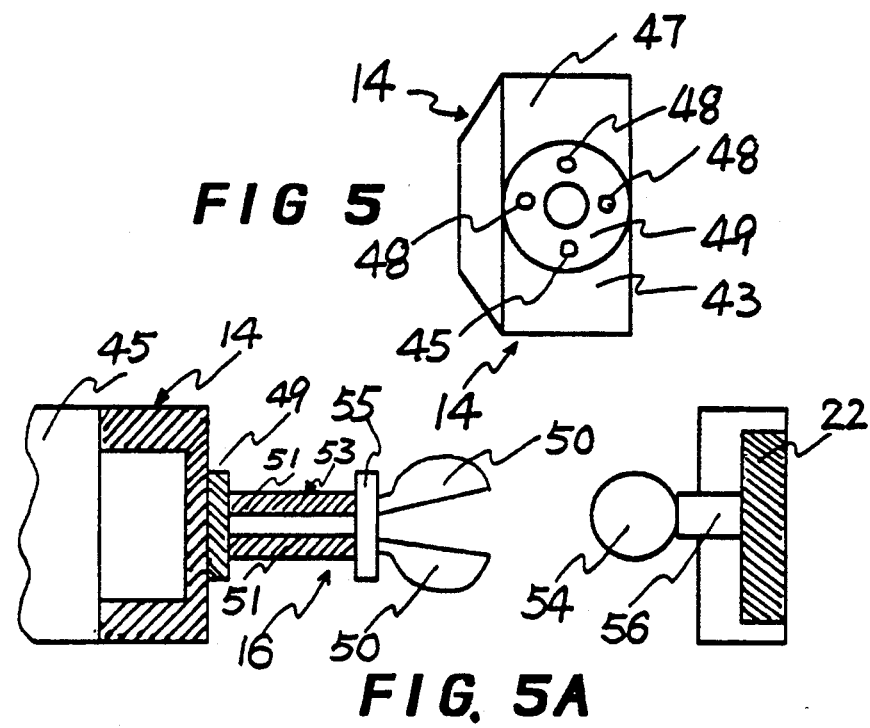
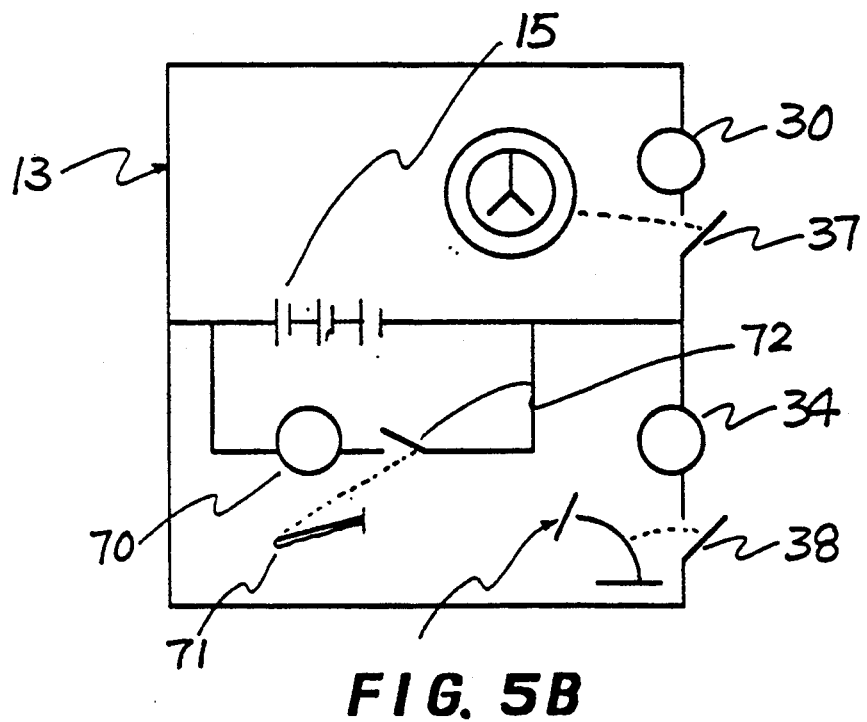

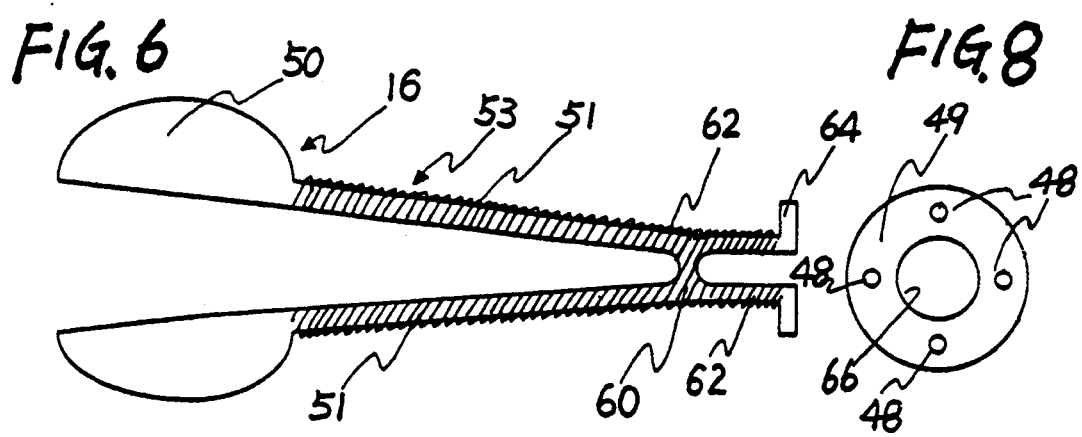
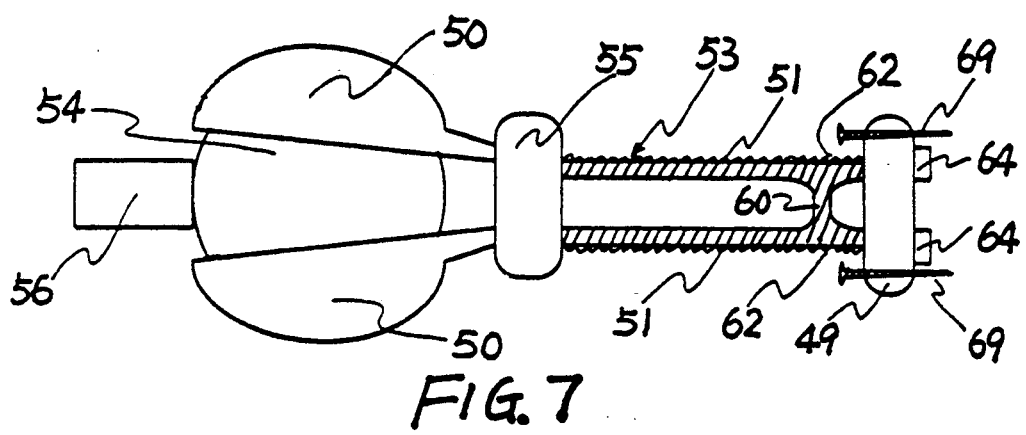
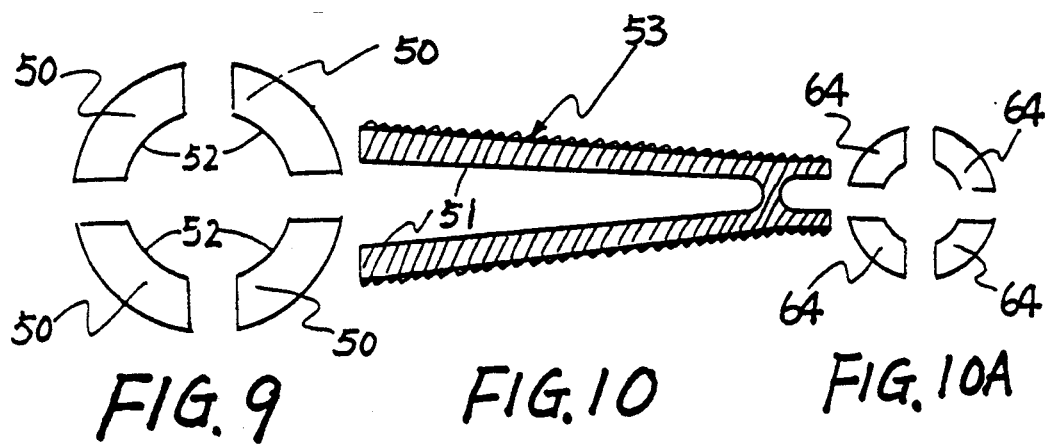

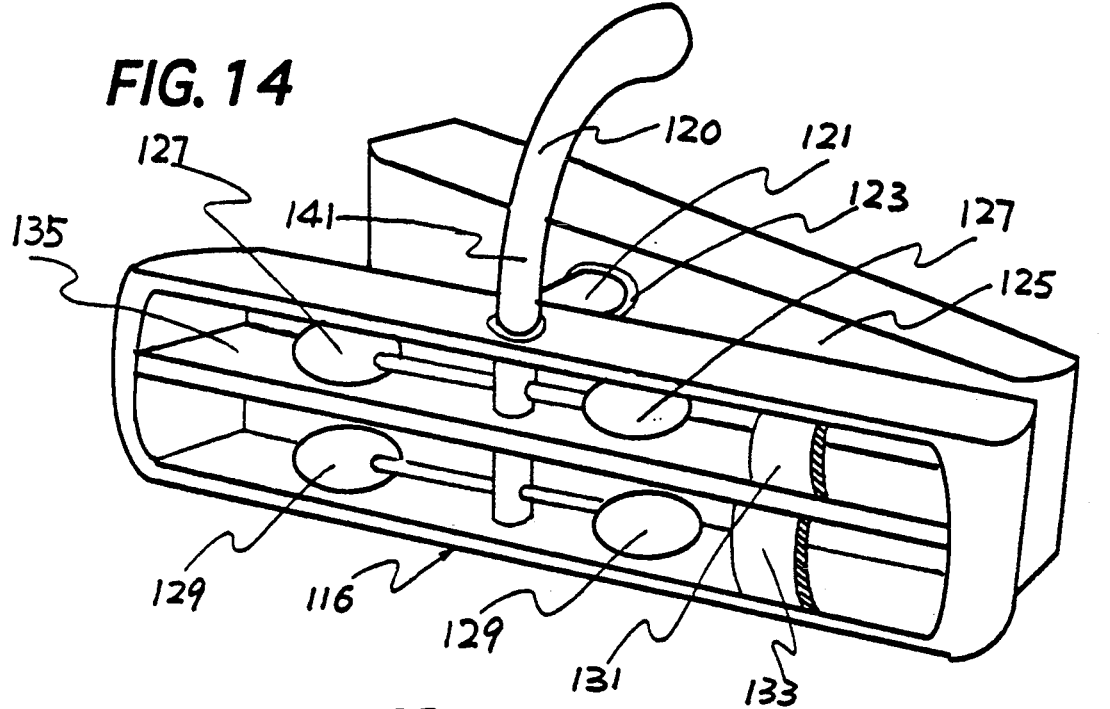
FIG. 14
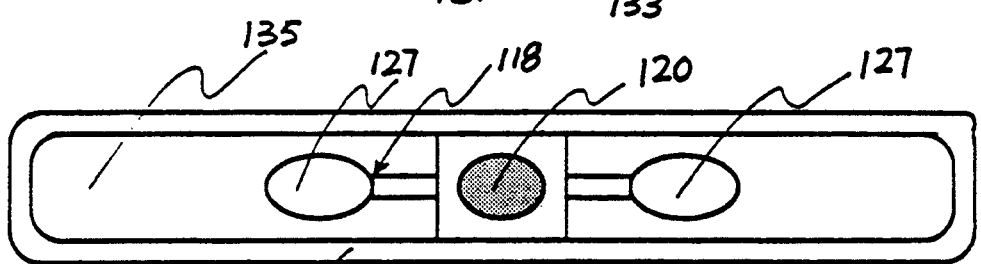
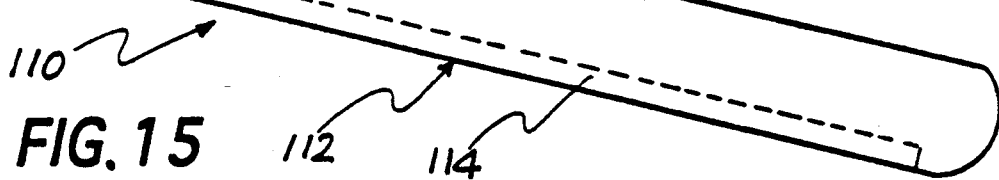
FIG. 15

COURTESY LAMP SYSTEM FOR VEHICLES

This application is a continuation-in-part of application Ser. No. 07/911,259, filed Jul. 7, 1992, now abandoned, which was a continuation-in-part application of application Ser. No. 07/815,573, filed Dec. 26, 1991, now abandoned, which was a continuation-in-part application of application Ser. No. 07/809,647, filed Dec. 17, 1991, now abandoned.

BACKGROUND OF THE INVENTION

This invention relates to improvements in rear view mirrors for vehicles and, more particularly, to a rear view mirror for a first, trailing vehicle to be used for signalling to the driver of a second, leading vehicle or to a pedestrian in front of the first vehicle.

In U.S. application Ser. No. 07/809,647, filed Dec. 17, 1991, now abandoned, a rear view mirror assembly is disclosed in which a courtesy brake lamp system, including several brake lamps are located near the front of the vehicle having a rear view mirror system. The lamps in the front of the vehicle provide additional brake signals to inform a driver of a leading vehicle that the driver of the trailing vehicle has applied the brakes. Thus, the driver in the leading vehicle does not have to be concerned about what is behind him because he knows that the trailing vehicle driver has applied the brakes for one or more reasons. Several embodiments of a courtesy lamp system for a rear view mirror are disclosed in this application including embodiments where the brake lamp is in the vehicle near the upper margin of the windshield, where the lamp is between the headlights of the vehicle, and where the lamp is on the front edge of the hood of the vehicle.

Application Ser. No. 07/815,573, filed Dec. 27, 1991, now abandoned, discloses improvements to the structure disclosed in application Ser. No. 07/809,647. The second application covers a courtesy lamp at the rear of the vehicle. Switch structure can be carried on the steering wheel of the vehicle to control the operation of the lamps on the rear view mirror and at the rear of the vehicle.

In application Ser. No. 07/911,259, filed Jul. 7, 1992, now abandoned, a rear view mirror having a front courtesy brake lamp is disclosed in which the mirror is adjustably mounted by a pivot pin about a generally vertical axis on a housing containing the lamp. The housing has only provisions for a single lamp. The use of the structure of this application overcomes the problem of not being able to adjust the rear view mirror when the same has a brake warning or courtesy lamp associated with it. It is thus important to try to overcome these limitations and disadvantages and the present invention does this by providing front and rear courtesy lamps and a front brake lamp on the housing of a rear view mirror assembly which can be adjusted at will, rather than being affixed as in prior disclosures mentioned above.

In the structure of U.S. Pat. No. 2,190,123, one side that is closer to the driver blocks the driver's view since it runs perpendicular to the windshield. The other side will not block the driver's view so it does not have to run perpendicular to the windshield. Also two lamps are mounted within one housing to serve only one purpose.

The structure of U.S. Pat. No. 3,665,392 does not combine the signal light with the rear view mirror. It blocks the driver's view above the rear view mirror.

The structure of U.S. Pat. No. 5,016,996 has the disadvantage in that the display side and the rear view mirror runs parallel. Thus the position of the display depends on the position of the rear view mirror. Since most of the time, the rear view mirror does not run parallel to the windshield, the display will not run parallel to the windshield either. This structure makes the display difficult or impossible to be seen from a certain angle in the front of a motor vehicle.

The structure of U.S. Pat. No. 2,400,655 uses English words for lamps. This may cause problems for people who do not speak English.

SUMMARY OF THE INVENTION

The present invention is directed to an improved rear view mirror assembly having a housing containing a courtesy lamp system and a rear view mirror assembly. The courtesy lamp system has a front lamp combined with the rear view mirror and a rear lamp. Both are green. The front lamp is for giving a pedestrian or a merging vehicle the right of way or courtesy. The rear lamp is for appreciation, such as "thank you", if merging was allowed.

The housing has a divider panel within the housing to divide the housing into upper and lower recesses containing light sources. A filter of a first color, such as green, is across the upper portion of the front access of the housing from the divider panel to the top wall of the housing; whereas, a filter of a second color, such as red, is across the lower portion of the front recess of the housing.

Light sources in respective spaces in the housing are coupled by circuitry to a manual switch and brake pedal, respectively, of the vehicle. When the manual switch is pressed, the front green light blinks on and off until the switch is deactuated. When the brake pedal is depressed, it will close a switch which will actuate the lamp associated with the red filter to indicate that the brake has been applied. Thus, a driver of a leading vehicle in advance of the vehicle having the courtesy lamp system will know that the driver of the trailing vehicle has applied the brake. The rear green lamp is coupled by circuitry to a second switch. When the manual switch is pressed, the rear green lamp blinks on and off until the switch is deactuated. Thus, the lamp system of the present invention provides a courtesy signal to the leading vehicle to provide a spirit of cooperation, goodwill, and safety on the highway, which would ordinarily not be available in the absence of the courtesy lamp system.

The mirror is coupled by a universal joint to an inner end wall surface of the housing. Thus, the mirror can be adjusted in all directions relative to the housing and provide an accommodation for drivers of different requirements for positioning the rear view mirror itself.

The primary object of the present invention is to provide a rear view mirror assembly for a vehicle in which the mirror assembly has housing structure with lamps at the front end thereof for signalling to drivers of vehicles in advance of the vehicle containing the mirror assembly wherein the mirror is coupled by a universal joint to an inner end wall surface of the housing of the assembly so that the mirror can be adjusted yet the mirror assembly can be provided with signalling means for courtesy purposes in the form of the lamp.

Other objects of the present invention will become apparent as the following specification progresses, reference being had to the accompanying drawings for an illustration of the invention.

BRIEF DESCRIPTION OF THE DRAWINGS

FIG. 5 is an end elevational view of the mirror looking in the direction of line 5—5 of FIG. 4;

FIG. 5A is a front elevational view, partly in section, of the mirror showing the universal joint for coupling the mirror to the housing;

FIG. 5B is a schematic wiring diagram of the circuitry containing the light source;

FIG. 6 is an enlarged rear elevational view of the part of the universal joint to be coupled to the mirror;

FIG. 7 is a view similar to FIG. 6 but showing the universal joint coupled to a ball secured to the inner surface of the housing;

FIG. 8 is a ring secured to one part of the universal joint and secured by screws to the mirror;

FIG. 9 is a side elevational view of the spoon-shaped parts of the universal joint;

FIG. 10 shows the shaft of the universal joint adjustment nut of FIG. 7;

FIG. 10A is an end elevational view of the shaft of FIG. 10;

FIGS. 14 and 15 are perspective and top plan views of another embodiment of the present invention.

DETAILED DESCRIPTION OF THE PREFERRED EMBODIMENT

Figure 1:
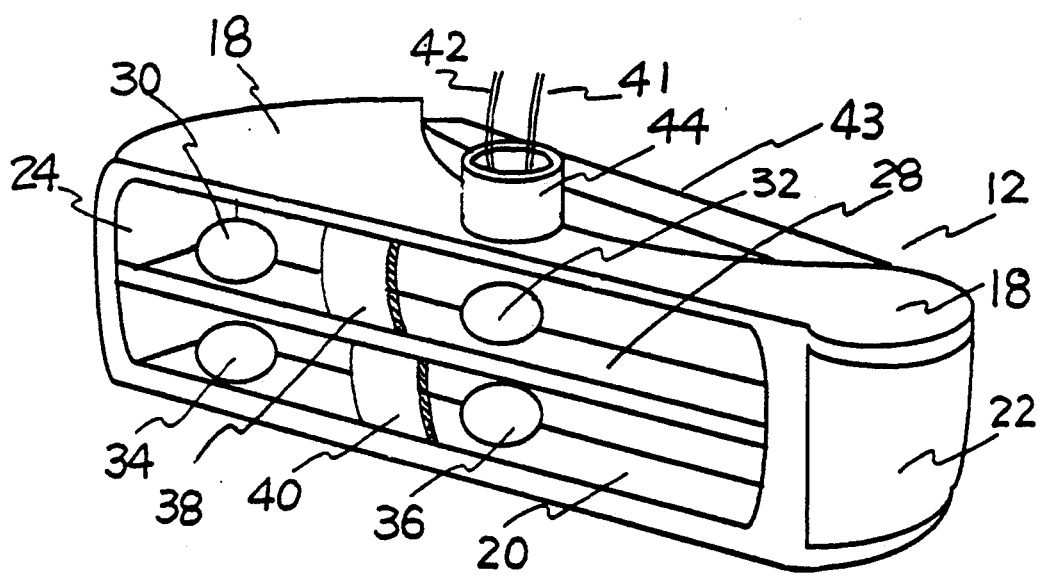
FIG. 1 is a perspective view of the housing of the lamp system of the present invention.
Figure 2:
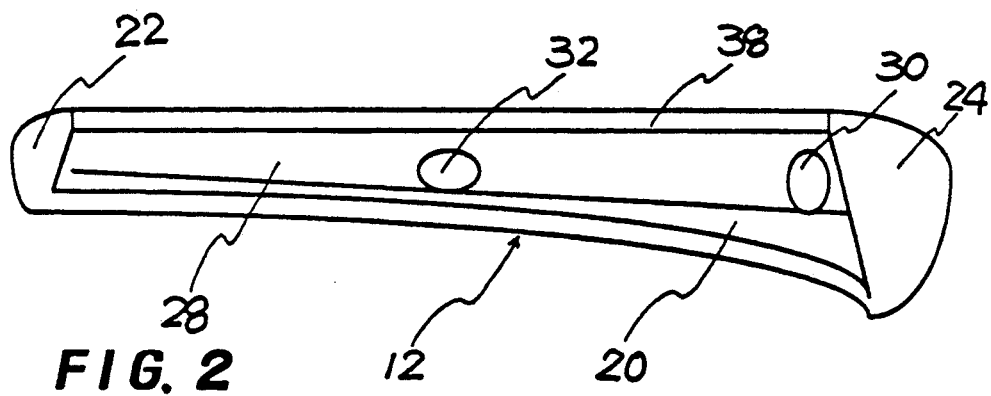
FIG. 2 is a top plan view of the housing showing the upper, green filter and the two spaced light sources for illuminating the green filter.

The courtesy lamp system mirror assembly of the present invention is broadly denoted by the numeral 10 and is adapted to be used with a vehicle, such as a passenger automobile, motorcycle, pick-up truck, heavy duty truck, tractor and the like. System 10 includes a hollow housing 12, a rear view mirror unit 14, and a universal joint 16 for pivotally coupling mirror unit 14 to the housing with the mirror unit at least partially extending into the housing.

The purpose of lamp system 10 is to provide a courtesy lamp for vehicle drivers and pedestrians located forwardly of the vehicle containing lamp system 10. As will be hereinafter described, lamp system 10 includes a green filter and a red filter at the front recess of the housing and the filters are illuminated by light bulbs in the housing. A vehicle driver or person seeing the illuminated blinking green filter will know that the driver of the vehicle containing lamp system 10 is willing to let merging in or giving the right of way, respectively. The illumination of the red filter will signal to a driver of a leading vehicle ahead of the trailing vehicle containing lamp system 10 that the latter vehicle is being braked to decelerate or stop. If the front green lamp is blinking and the front red lamp is on at the same time, to the leading vehicle in the next lane it means that merging in is welcomed and the vehicle is slowing down; to a pedestrian, it means the pedestrian has been given the right of way while the vehicle is approaching the pedestrian or is totally stopped. Thus, the driver of the leading vehicle in advance of the trailing vehicle containing the lamp system 10 will know that it is safe to move in ahead of the trailing vehicle. Thus, the trailing vehicle driver performs a courtesy act toward the driver of the leading vehicle in front of the trailing vehicle, all being done in the interests of good driving safety and the maintaining of good manners among drivers, especially when the vehicles are traveling at moderate to high speeds over roadways with considerable traffic.

Housing 12 contains an upper wall 18, a bottom wall 20, and a pair of side walls 22 and 24. The front face of housing 12 is a recess 20. A horizontal divider wall 28 is in the housing between the upper wall 18 and the lower wall 20. Wall 28 separates housing 12 into two generally light-tight compartments, one compartment including a pair of light bulbs 30 and 32 and the other compartment containing light bulbs 34 and 36.

A green filter 38 (FIG. 3) is across the open front end recess 26 from wall 28 to wall 18. A red filter 40 is across the open front end recess 26 in housing 12 between wall 28 and bottom wall 20. Thus, when light bulbs 30 and 32 are energized, a person in advance of lamp system 10 will see a green glow of the green filter 38. Likewise, when bulbs 34 and 36 are energized, a person in advance of housing 12 will see a red glow.

Suitable switches 37 and 38 in circuitry 13 (FIG. 5B) having a battery 15, are provided to energize the light sources. For instance, the light bulbs 30 and 32 associated with the green filter will be coupled with switch 37 which is a manual switch mounted at some suitable locations, such as on the steering wheel 39. The light bulbs 34 and 36 associated with the red filter will be coupled to the vehicle brake pedal 33.

The electrical leads 41 from bulbs 34 and 36 and the electrical leads 42 from bulbs 30 and 32 are directed out of housing 12 through a tube 44 which is adapted to be the mount for system 10 by which the assembly is mounted on an inner surface, such as the windshield or the roof of a vehicle. The leads 41 and 42 are coupled with the manual switch 37 and brake pedal 33 as described above. The filters 38 and 40 will be coupled across recess 26 in any suitable manner.

Mirror unit 14 includes a plane or other mirror 43 mounted across the rear opening of a hollow shell 45. The left hand end wall 47 of shell 45 is flat to which a solid ring 49 having spaced screw holes 48 therethrough is attached. Ring 49 is adapted to permit the mounting of legs 51 of a shaft 53 forming part of a universal joint 16 as hereinafter described. It is the rear view mirror 43 which the driver of the vehicle having system 10 looks into so as to view the region at the rear of the vehicle in the usual manner of using a rear view mirror.

Universal joint 16 can take any suitable form if desired. For purposes of illustration, it takes the form shown in FIGS. 5A–10 in which a plurality of segments 50 of a sphere are coupled together by an internally threaded screw ring 55 on a shaft 57 which is coupled to ring 49 described above with respect to FIG. 5.

For purposes of illustration, there are four segments 50 which have spherical inner surfaces 52 for engaging a ball 54 secured by a fastener 56 to housing side wall 22.

Each segment 50 is coupled to a shaft element 51 which is externally threaded so that the threads of the various elements 51 mate with each other so that screw ring 55 can be threaded onto shaft 53 in the manner shown in FIG. 7.

Figure 4:
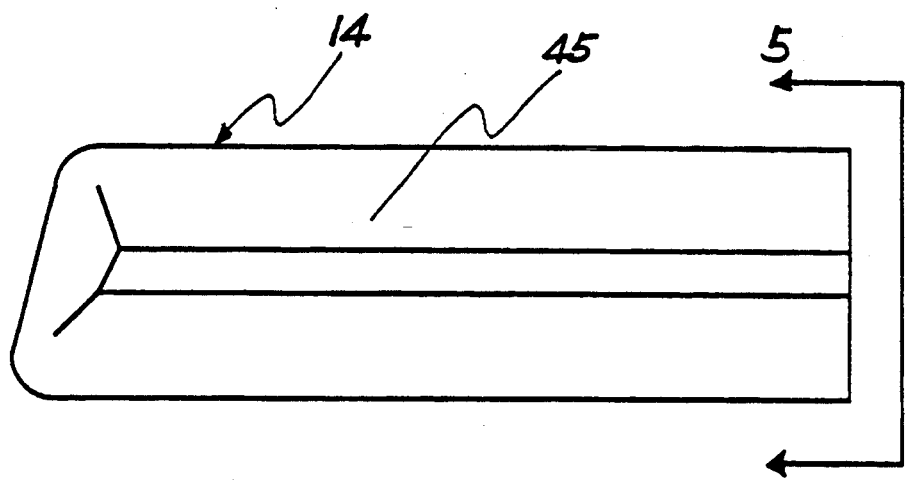
FIG. 4 is a front elevational view of the mirror of the assembly.

Each element 51 is resilient and projects outwardly from a central connection zone 60 (FIG. 6) whereby at zone 60 (FIG. 6), the four shaft elements 51 are integral with each other. Also, resilient shaft elements 62 for respective shaft elements 51 project away from zone 60 and have feet 64 which are received within the central hole 66 of ring 49 (FIG. 8). The elements 62 are also resilient so that, when the feet 64 are moved together, they form a shaft and part of small enough diameter that the feet 64 can be forced through hole 64 and allowed to snap outwardly against inner surface 66 when such elements 62 are released. This causes the shaft end part to be coupled to ring 49 so that screws 69 (FIG. 7) can be used to couple the ring 49 to the end wall 47 of mirror shell 45 (FIG. 4).

Ring screw 55 is first threaded onto shaft 57 before ring 49 receives feet 64 in hole 66. The resilience of elements 51 (FIG. 6) is such that the segments diverge in the manner shown in FIG. 6 until ball 54 is placed in the space surrounded by members 50 (FIG. 9). Then, ring 49 receives feet 64 and the feet spring outwardly to couple shaft 53 to the ring 49. Then, the ring is coupled by screw 69 to wall 47 of mirror shell 45. As ring screw 55 is advanced to the left when viewing FIG. 7, segments 58 move toward each other and have a spring biased effect, tending to separate the members 50. However, the members 50 embrace frictionally engage ball 54 to form the universal joint 16. Backing off screw 55 loosens the frictional engagement of members 50 on ball 54 so that the mirror 43 can be adjusted yet be moved in all directions. When screw 55 is backed off to a certain point, the ball 54 and members 50 can be separated, so the driver can choose to use either a plane or a wide angle rear view mirror.

Figure 11:
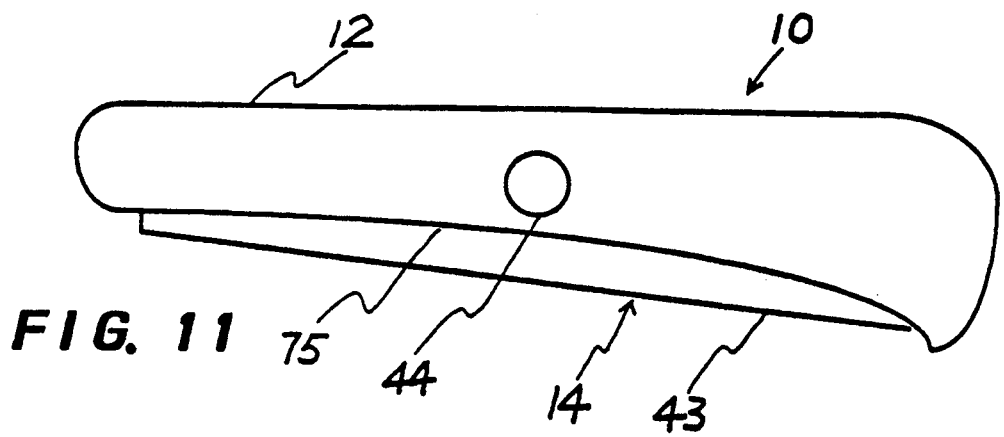
FIG. 11 is a top plan view of the mirror assembly with the mirror fully received within the housing.
Figure 12:
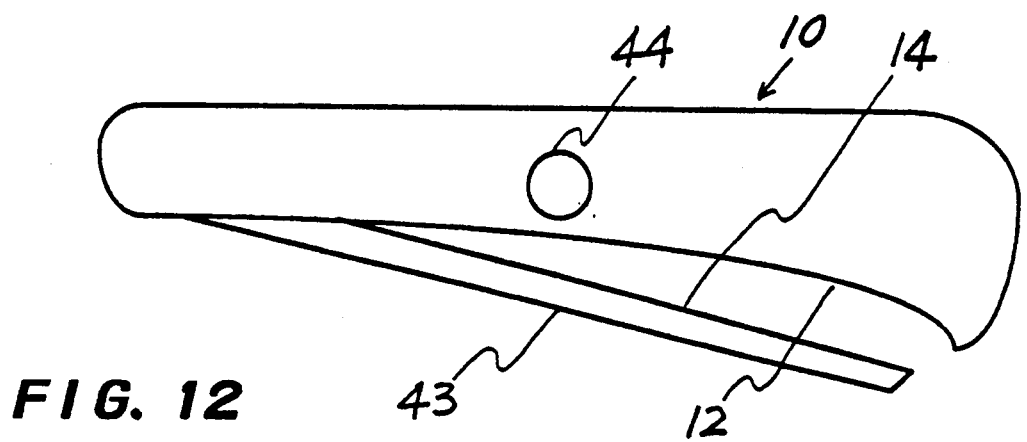
FIG. 12 is a view similar to FIG. 11 but showing the mirror completely out of the housing except for the universal joint.
Figure 13:
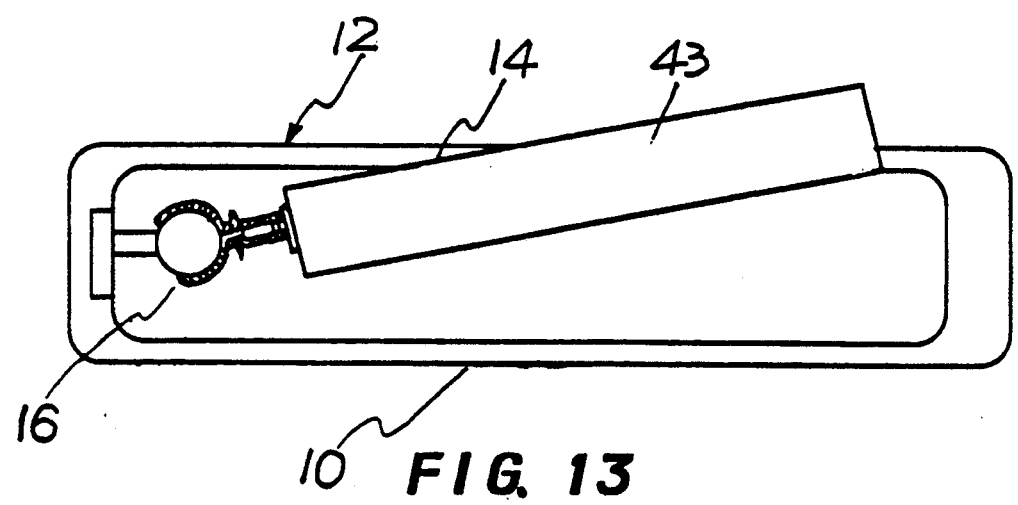
FIG. 13 is a rear elevational view of the mirror assembly, showing the mirror twisted or canted with reference to the universal joint.

FIG. 11 shows the mirror 43 substantially completely within housing 12. The rear edge 75 of housing 12 is curved to always expose a part mirror unit 14 to make it easy to grasp when adjusting the mirror. FIG. 12 shows mirror unit 14 with the mirror 43 extending at an acute angle with respect to housing 12. FIG. 13 shows the universal joint 16 allowing mirror unit 14 to pivot about a generally horizontal axis into an inclined position with the right hand end of the mirror elevated with respect to the left hand end.

Figure 3:
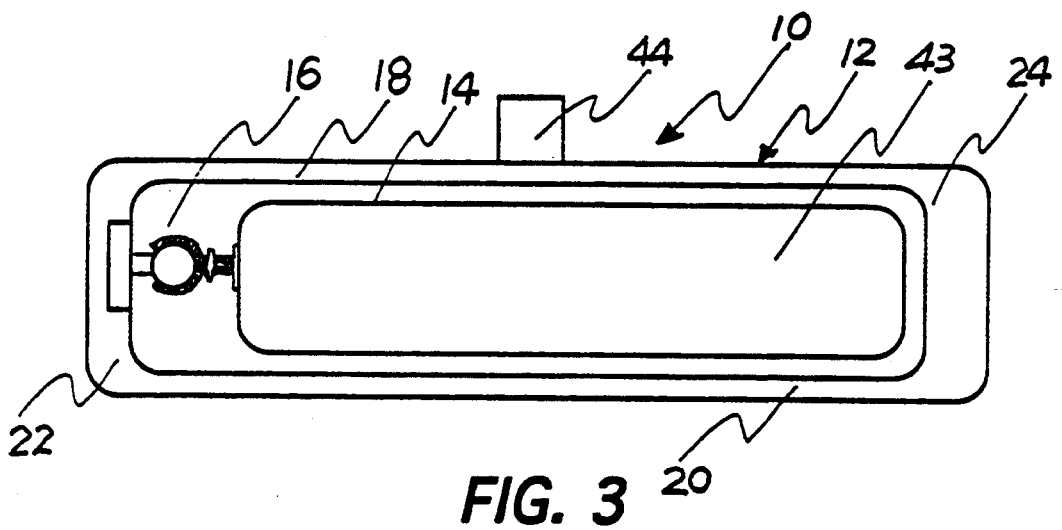
FIG. 3 is a rear elevational view of the rear view mirror assembly of the present invention, showing the way in which the mirror of the assembly is coupled by a universal joint to the housing containing light sources for illuminating a red filter and a green filter on the front of the housing.

In use, lamp system 10 is mounted in some suitable manner to the windshield or to the roof of the vehicle. Leads 41, 42 will have been fed through tube 44 as shown in FIGS. 1 and 3 for coupling to the switches 37 and 38 (FIG. 5B). A red filter 40 will be across the portion of the opening extending between opaque strip 28 and bottom wall 20 of housing 12; whereas, green filter 38 will be across the portion of the opening 26 extending from top wall 18 to central wall 28. When the driver of the vehicle actuates switch 37, lights 30 and 32 will be energized and will blink on and off to signal to a driver or pedestrian in advance of the vehicle that the vehicle driver is aware of their presence and is allowing them the right of way.

If the vehicle having system 10 is braked so as to decelerate it, lights 34 and 36 are energized to signal to the driver in advance that the vehicle behind him will be braking so that the driver does not have to worry too much about the vehicle behind and can concentrate on the vehicles in front. In this way, system 10 provides a courtesy lamp in combination with a rear view mirror which can be adjusted in all directions by universal joint 16.

The rear green lamp 70 will be energized and will blink on and off to express appreciation after the driver is down with merging. The manual switch 72 can be located at the end of the turn signal level 71 because this action is usually immediately followed by the turn signal returning to its original position after merging.

Another embodiment of the courtesy lamp system for a vehicle of the present invention is shown in FIGS. 14 and 15 and is broadly denoted by the numeral 110. System 110 includes a first housing 112 for mounting a mirror, such as a plane mirror 114 to the housing 112. A second housing 116 is coupled by a connector 121 to the front face of housing 112.

A universal joint is coupled to the front face 125 of housing 112 as shown in FIGS. 14 and 15. The universal joint can be of any suitable construction, such as the construction shown in FIGS. 6–11 described above with respect to the first mentioned embodiment.

The light structure 118 of the present invention includes one or more light sources or light bulbs 127 which are carried by housing 116 in respective upper and lower compartments in the housing 116, the upper and lower light sources 127 and 129 being shown in dashed lines in FIG. 14. A green filter 131 and a red filter 133 are carried by the housing 116 across the front open end thereof above a dividing wall 135.

A tube 141 is used to mount the two housings 112 and 116 on a suitable structure, such as the windshield or roof of the vehicle in which the system 110 is used.

In operation, tube 141 is coupled to the vehicle in some suitable manner. Typically, housing 116 will remain fixed and need not be moved at all. The filters will have front faces which are generally parallel with the windshield and the light sources 127 and 129 in the housing operate in the sequence described above with respect to the other embodiment of FIGS. 1–13. Housing 112 can be adjusted with reference to housing 116 in all directions because of the presence of universal joint 123.

What is claimed is:

1. A courtesy lamp system for a vehicle comprising:
    an elongated housing having a pair of opposed ends, said housing also having a front recess;
    means coupled with the housing for defining a lamp array in the recess, said lamp array including a number of lamps, and means for coupling the lamps of the array to a portion of the vehicle;
    an elongated mirror having a pair of opposed ends; and
    universal joint means shiftably coupling one end of the mirror to one end of the housing for movement relative to the housing so as to allow the mirror to be selectively adjusted in a plurality of directions and about a plurality of pivot axes.

2. A system as set forth in claim 1, wherein the rear edge of the housing is curved.

3. A system as set forth in claim 1, wherein the housing is hollow to present an interior space therewithin, there being a horizontal wall providing a space into an upper compartment and a lower compartment.

4. A system as set forth in claim 3, wherein said lamp array includes a light source in the upper compartment and a light source in the lower compartment and conductor leads for coupling the light sources to a manual switch and the vehicle brake pedal, respectively.

5. A system as set forth in claim 3, wherein said front end has an opening therethrough, said divider wall being intermediate the ends of the opening, there being a first filter across the space between the divider wall and the top wall of the housing and a second filter between the divider wall and the bottom wall of the housing.

6. A system as set forth in claim 1, wherein said means on said housing includes a tube for coupling the housing to an inner surface of a vehicle.

7. A system as set forth in claim 4, wherein said coupling means includes a tube for coupling the housing to the inner surface of the windshield of the vehicle.

8. A system as set forth in claim 7, wherein said tube has an upper end adopted to be coupled to the roof of the vehicle.

9. A courtesy lamp system for a vehicle comprising:
an elongated housing having a recess;
means coupled with the housing for defining a lamp array in the recess, said lamp array including a number of lamps, and means for coupling the lamps of the array to a portion of the vehicle;
an elongated mirror; and
a universal joint shiftably coupling the mirror to the housing to allow the mirror to be selectively adjusted in a plurality of directions and about a plurality of pivot axes with respect to the housing, said universal joint being coupled to the mirror at one end thereof and to said housing at a first end thereof.

10. A system as set forth in claim 9, wherein said mirror includes a hollow shell having an open rear end, a mirror across the open end, said shell having a flat end wall, said universal joint adapted to be coupled to the end wall of the shell and to an adjacent end wall of the housing.

11. A system as set forth in claim 9, wherein said lamp array includes a first front light source, a second front light source, and a rear light source, the first front light source and the rear light source being coupled in series with each other, there being a manual switch coupling the first front and rear light source to a power means, the second front light source being coupled to the brake pedal of the vehicle.

12. A system as set forth in claim 9, wherein said housing includes a first housing and a second housing, first housing containing said lamp array and second housing including the mirror, and universal joint means coupling the second housing to the first housing.

13. A system as set forth in claim 12, wherein said second housing is rearwardly of the first housing, there being a connector expanding the distance between the two housings, the rear end of the connector having said universal joint means thereon, said mounting means including a tube coupled to the top wall of the first housing and including a circuitry means for coupling the light sources in the first housing with a power source, said circuitry including a number of electrical conductors extending through the tube between the vehicle and the upper wall of the first housing.

14. A courtesy lamp system for a vehicle comprising:
a housing having a front recess;
means coupled with the housing for defining a lamp array in the recess and at the rear of said vehicle, said lamp structure having means for coupling the lamp of the array to a portion of the vehicle;
a mirror; and
universal joint means coupling the mirror to the housing to allow the mirror unit to be adjusted in a plurality of directions about a plurality of pivot axes with respect to the housing said housing is provided with an open rear end, said mirror being movable into and out of said open end.

15. A courtesy lamp system for a vehicle comprising:
a housing having a recess;
means coupled with the housing for defining a lamp array in the recess, said lamp array including a number of lamps, and means for coupling the lamps of the array to a portion of the vehicle;
a mirror; and
a universal joint shiftably coupling the mirror to the housing to allow the mirror to be selectively adjusted in a plurality of directions and about a plurality of pivot axes with respect to the housing, said universal joint being coupled to the mirror at one end thereof and to said housing, there being a hollow shell having an open rear end, a mirror across the open end, said shell having a flat end wall, said universal joint adapted to be coupled to the end wall of the shell and to an adjacent end wall of the housing, said universal joint including a plurality of segments of a sphere, means mounting the segments on said shell of the mirror unit, and a ball embraced by and frictionally engaged by the segments, said ball being coupled to the inner surface of the housing.

16. A system as set forth in claim 15, wherein said coupling means includes a shaft coupling the segments to the shell of the mirror unit.

17. A system as set forth in claim 16, wherein said shaft is externally threaded and has a plurality of resilient shaft elements normally diverging from each other, and a nut threadably mounted on the elements of the shaft for moving the segments toward and away from each other to thereby adjust the frictional contact between the segments and the ball.

18. A system as set forth in claim 16, wherein is included a number of feet on the shaft of the universal joint, a ring having a central hole therethrough, said shaft having a number of feet extending through the hole and biased outwardly with respect thereto, and means for attaching the ring to the shell of the mirror unit.

19. A system as set forth in claim 17, wherein said lamp array includes a pair of spaced lamps in the upper compartment of the first housing and a pair of spaced lamps in the lower compartment of the first housing, said conductor lead means extending from the lamps through the coupling means to a power source of the vehicle.

20. A system as set forth in claim 15, wherein the lamp array encloses a first light source of a first color in the recess, a second light source of the same color at the rear end of the vehicle, a third light source of a second color in the recess, there being first and second manual switches coupled to the first and second light sources to actuate the first and second light sources independent of each other, and a third switch coupled with the third light source and the brake pedal of the vehicle for simultaneously actuating the third light sources and the brake pedal light of the vehicle.

* * * * *